Inventors
John E. Cope
Patrick A. Segrave
Donald H. Fisher
By Holcombe, Wetherill & Brisebois
Attorneys Inventor
John E. Cope
Patrick A. Segrave
Donald H. Fisher
By Holcombe, Wetherill & Brisebois
Attorney Inventor
John E. Cope
Patrick A. Segrave
Donald H. Fisher
By
Holcombe, Wetherill & Brisebois
Attorney 2,875,277

TELEVISION RECEIVERS

John Edward Cope, Patrick Arthur Segrave, and Donald H. Fisher, Cambridge, England, assignors to Pye Limited, Cambridge, England, a British company Application January 11, 1954, Serial No. 407,106

Claims priority, application Great Britain January 15, 1953

6 Claims. (Cl. 178—7.3)

Figure 1:
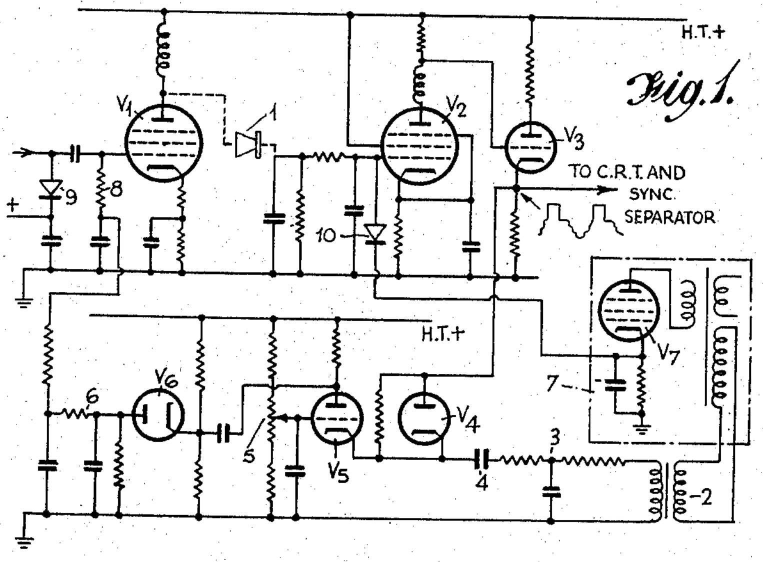

In the reception of television signals, fading of the picture signals often occurs. In "fringe" areas the fading is often evident as a slow, periodic variation of the signal level, and in all areas signal reflections from passing aircraft produces a peculiarly characteristic picture "flutter" which may, at times, reach proportions sufficient to throw the time bases completely out of synchronism.

To correct such fading some kind of automatic control would be desirable. The automatic gain control circuits used in sound broadcast receivers cannot, however, be applied to automatic gain control (hereinafter referred to as automatic picture control) in television receivers. In the case of sound broadcasting, the mean value of the radio frequency carrier wave remains constant, independently of the presence of modulation, and it is, therefore, a simple matter to derive in the sound receiver a controlling voltage which is proportional to the strength of the received signal and to use this to control the gain of the receiver.

In the case of television reception, the vision carrier-wave mean value is proportional to the relative brilliance of the picture detail which varies continually from absolute black to extreme white. Consequently the mean value of the received television signal is fluctuating continuously and no simple method is possible of effectively evaluating the relative signal strength in the same way as is possible with sound broadcast receivers.

The present invention provides an automatic picture control for television receivers which achieves the desired result, whilst involving only relatively slight circuit additions, the cost of which is more than justified by the greatly improved performance achieved.

The automatic picture control according to this invention operates in response to the voltage level of the very short duration signal representing the black level, which is transmitted in the television waveform following each line synchronising pulse, generally referred to as the back porch. As these brief duration black level periods of the waveform always represent black, their voltage level will vary in value at the receiver only when fading is experienced. This black level signal is therefore used, in the apparatus according to the invention, as a reference level for evaluating, by the automatic picture control sampler, a control voltage for automatically controlling the gain of the receiver, and the invention provides means, which are both effective and simple, for limiting the action of the sampler to that part, and that part only, of each line scanning cycle where the black level signal occurs, whilst suppressing the action of the sampler during the unwanted picture portions and the synchronising pulse periods of the scanning lines.

The present invention also consists in a television receiver wherein the demodulated received signal is applied to a signal sampling diode or equivalent rectifier which is normally non-conducting and is periodically rendered conducting for a very short duration, not exceeding the duration of the black level signal, by short duration gating pulses derived from a part of the circuit which is free from interference pulses, particularly from the line time base, and delayed by a time interval such that the gating pulses occur only during the black level periods to cause the diode to take current during the gating pulse periods and apply the black level voltage to an amplifier and smoothing circuit to produce a control voltage which is fed to control the gain of the receiver.

The gating pulses are preferably derived from the line output transformer of the receiver and are fed through an appropriate delay network to switch the diode. Preferably the large voltage pulses induced in the line output transformer during each flyback period are applied to the diode through a pulse transformer and associated delay circuit, the circuit constants of which are arranged to delay the pulses by a few microseconds so that they occur only during each black level period following each line synchronising pulse.

According to a feature of the invention a device for reducing the interference-to-signal ratio is connected in the input to the sampling diode so that disturbance, due to the sampling diode being gated at the same instant as that at which an interference pulse occurs, will be reduced or eliminated.

Preferably a buffer device is also included in the input circuit to the sampling diode so that the gating pulses will not cause pulse breakthrough on the video channel, which might otherwise interfere with the synchronising circuits of the receiver.

In order that the invention may be more clearly understood, reference will now be made to the accompanying drawings, in which Fig. 1 is a circuit diagram of the relevant parts of a television receiver for effecting automatic picture control during reception of television signals from the British Television Service.

Figure 2:
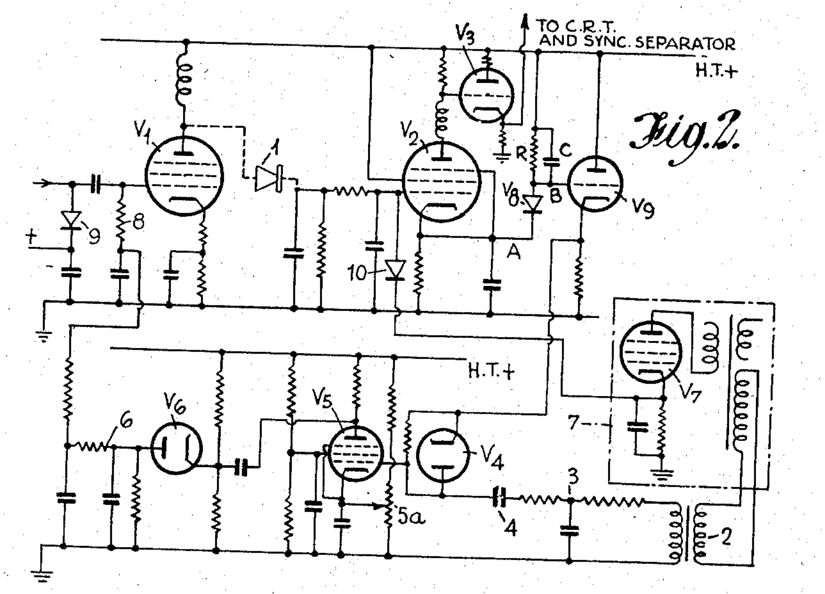

Fig. 2 is a modified automatic picture control circuit.

Figure 3A:
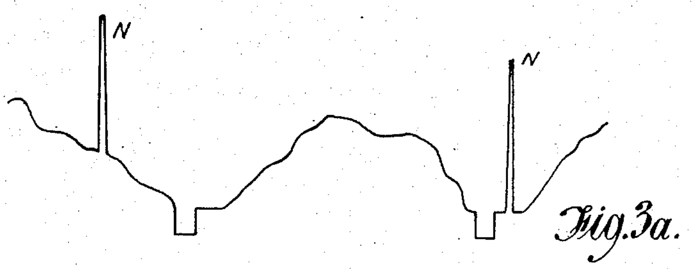
Figure 3B:
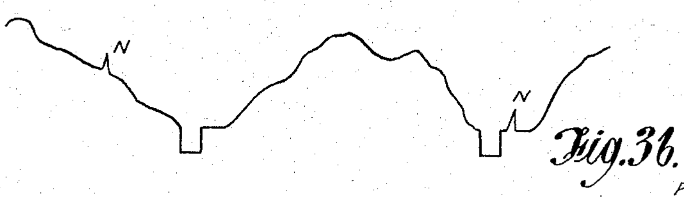

Figs. 3*a* and 3*b* are waveforms for explaining the operation of the circuit of Fig. 2.

Figure 4:
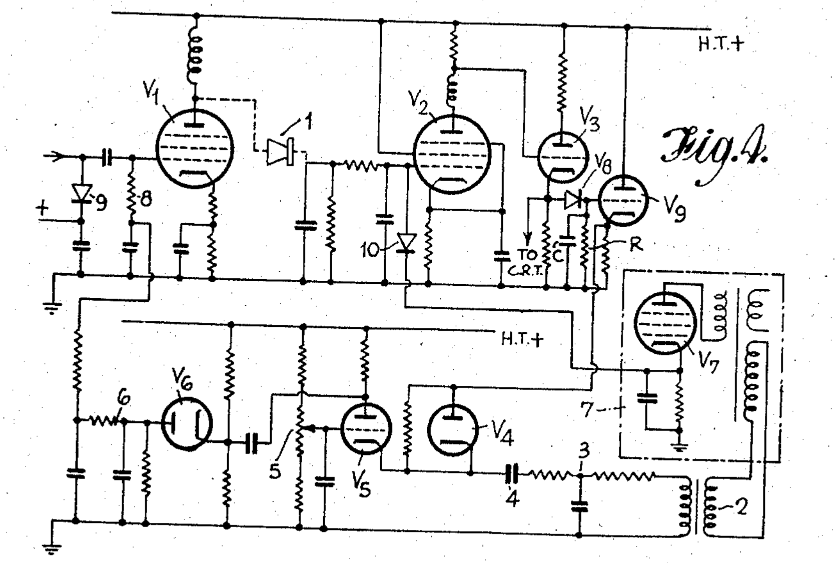
Figure 5:
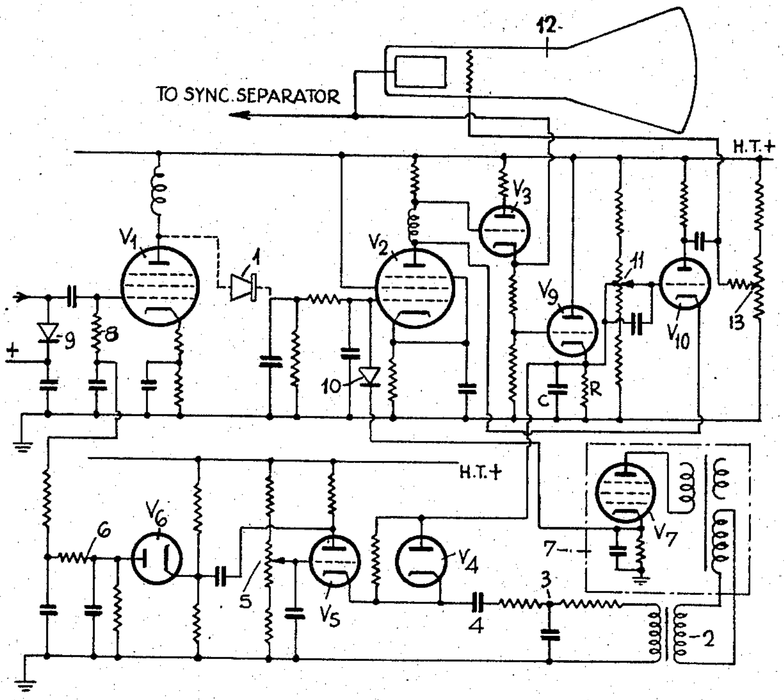

Figs. 4 and 5 are circuit diagrams of further modified arrangements.

Referring to the embodiment shown in Fig. 1 of the drawing, the received video waveform, after passing through the input stages of the television receiver, is fed through the first I. F. amplifier $V_1$, the signal detector 1 and the video amplifier $V_2$, which is followed by the cathode follower $V_3$ from which the video signal is normally fed to the cathode ray tube and the synchronising separator circuits. The polarity of the signal at the output of the cathode follower $V_3$ is such that the synchronising pulses are positive with respect to the picture signals.

The output from the cathode follower $V_3$ is also connected to the anode of a signal measuring or signal sampling diode $V_4$, the cathode of which is connected to the cathode of an amplifier $V_5$.

The large voltage pulses induced in the line output transformer of the line time base 7 during the flyback periods are applied through the pulse transformer 2, the delay network 3, and the condenser 4 to the cathode of the diode $V_4$. The circuit constants of the delay network 3 are arranged to delay the pulses from the line output transfermer by a few microseconds so that they are applied to the cathode of the diode $V_4$ during, and only during, the short duration periods corresponding to the black level periods which follow each line synchronising pulse in the television waveform. These gating pulses are applied in a negative sense to the cathode of the diode $V_4$ so that the diode will take current during the pulses, thereby connecting the cathode of the cathode follower valve $V_3$ to the cathode of the amplifier $V_5$ during the black level periods. The peaks of the delayed gating pulses are therefore restored to the cathode follower output potential during the black level periods, and the potential applied to the amplifier $V_5$ is a measure of the absolute voltage of the black level periods with respect to the negative chassis potential of the receiver. As the signal strength, and consequently the absolute voltage of theb lack level varies, this control potential varies and changes the output in the amplifier $V_5$.

The control grid of the amplifier valve $V_5$ is connected to a variable tapping on potentiometer 5 constituting the contrast control. Adjustment of the contrast control determines the amount of the measured pulse which is amplified by the amplifier $V_5$ and therefore acts as a manual gain control irrespective of whether a signal is present or not. The output from the amplifier $V_5$ is fed through the rectifying diode $V_6$ and the smoothing circuit 6, and the smoothed control voltage is fed to vary the valve bias applied to the first I. F. amplifier $V_1$ as set by the contrast control, and consequently automatically controls the gain of the receiver.

By reason of the natural high impedance of the automatic picture control circuit connected to the grid of the valve $V_1$, there would be a tendency for this valve to run into grid current upon the reception of a large interference pulse. This may be avoided by applying the control voltage to the grid of $V_1$ in series with the damping resistor 8, and connecting across the tuned grid circuit a diode or other rectifier 9 which is returned to a low positive voltage. This voltage is chosen so that the rectifier does not conduct on normal signals but conducts on higher voltages to prevent impulsive interference reaching an ampltiude sufficient to cause grid current.

When the receiver is first switched on, the automatic picture control circuit does not commence to operate (due to the slow warming up of the timebase) until some time after the radio frequency, intermediate-frequency, and video amplifier valves of the receiver have become operative. Until the automatic picture control circuit begins to operate no control voltage will be developed by $V_6$ and the possibility occurs that the valve $V_2$ would be overloaded if very large signals were received under these conditions. Such overloading would not only cause damage to the valve $V_2$ but can result in inversion of the signal at the anode of $V_2$. The black level portion of such a vastly increased signal would then occur at a potential normally considered as referring to zero signal, and when the gating pulses are applied to the sampling diode $V_4$, no control voltage would be produced to overcome the overloaded state.

To avoid such a condition arising, a diode or crystal rectifier 10 is connected between the grid of $V_2$ and a very low impedance source of potential approximately equal to the highest input potential normally expected at the grid of $V_2$. Such a source is conveniently provided at the cathode of the output valve $V_7$ of the line timebase 7, and the circuit shows the rectifier 10 returned to the cathode of $V_7$. If a large signal now occurs during warming up, the rectifier 10 passes current so long as its bias is surpassed, thus limiting the signal to the bias potential so that inversion cannot take place in $V_2$. Until the line output valve $V_7$ is working, the diode is biassed down to chassis potential and any signal applied to the grid of $V_2$ is short-circuited. When the line output valve $V_7$ begins to work, its cathode voltage rises and biasses the diode to a voltage sufficient to allow the video amplifier $V_2$ to operate.

The rectifier 10 also prevents $V_2$ from being driven into grid current by interference pulses. This is important since $V_2$ must be heavily compensated to produce the required frequency response and the time constant formed by its cathode resistor and condenser is large. Consequently, if an interference pulse could cause grid current, the valve would be held in a cut-off condition for some time after the interference pulse had ceased.

With the arrangement described with reference to Fig. 1, it has been possible to produce a receiver which provides a stable picture of consistent contrast and brilliance despite signal fluctuations as great at 10:1, and also provides substantially complete freedom from aircraft amplitude "flutter" even of comparatively rapid frequency. The signal measuring diode $V_4$ prevents ignition interference from appreciably affecting the automatic gain control. If an ignition pulse is received while $V_4$ is conducting, it will cause the cathode of $V_3$ to become more negative. Thus the anode of $V_4$ will become more negative. Since the duration of the ignition pulse is very short compared with the time constant in the cathode of diode $V_4$, this diode will become non-conducting and the change of potential on the cathode of amplifier $V_5$ will be only a small fraction of the potential change, due to the ignition pulse, on the cathode of $V_3$.

However, the circuit of Figure 1 is not entirely uninfluenced by the presence of large and continuous impulsive interference and, furthermore, the application of large gating pulses to the sampling diode $V_4$ produces a slight change in the potential on the cathode of $V_3$ due to its finite impedance, with the consequence that gating pulse breakthrough can occur on the video waveform during the back porch periods. Excessive clipping is necessary in order to prevent this pulse breakthrough from interfering with the synchronising circuits.

The difficulties resulting from impulsive interference can, however, be overcome by connecting a device in the input to the sampling diode which reduces the interference-to-signal ratio, for example, by connecting to the input of the sampling diode an integrating network having such a time constant that its bandwidth will be restricted with respect to the bandwidth passed by the receiver, thereby to cut-off or reduce impulsive interference. The problem of gate pulse breakthrough can be overcome by including a buffering device in the input circuit to the sampling valve.

Fig. 2 shows one form of circuit incorporating these additional devices in which the sampling valve $V_4$ is fed from the cathode of $V_2$ instead of from the cathode of $V_3$ as in the circuit of Figure 1. The video signal at the cathode of $V_2$ will be of opposite polarity to that at the cathode of $V_3$, that is it will be positive-going. Consequently, the direction of the sampling diode $V_4$ will have to be reversed with respect to Fig. 1. The input from the cathode of $V_2$ to the sampling valve $V_4$ includes a diode or other rectifier $V_8$ having its cathode connected to the cathode of $V_2$ and a resistance-capacity integrating network RC in its anode lead which is connected to a source of positive potential. The resistance R is chosen so that the current through $V_8$ is sufficient to allow conduction with all video components, while the value of the capacity C is chosen to restrict the bandwidth so that noise impulses (which have a rise time depending upon the limiting bandwidth of the receiver) will cut-off $V_8$. Consequently during a single noise impulse the charge across RC rises according to the value of its time constant, and a considerable reduction in the noise-to-signal ratio is produced in the signal at the output B of $V_8$.

In practice the bandwidth at the anode of $V_8$ should be between 10% and 30% of the bandwidth of the receiver in order faithfully to transfer the synchronising pulses and yet to produce a waveform at the output of $V_8$ which is substantially immune to interference.

As shown in the curves of Figures 3*a* and 3*b*, the noise impulses N occurring in the waveform at the input A to $V_8$ (Figure 3*a*) will have these pulses substantially suppressed, as shown in Figure 3*b*, at the output B of $V_8$.

Since the sampling valve $V_4$ is preferably connected to a low impedance source, a cathode follower valve $V_9$ is inserted between the output of $V_8$ and the sampling valve $V_4$, which is arranged so that its cathode will be connected to the cathode of $V_9$ in view of the positive-going nature of the signals at the cathodes of $V_2$ and $V_9$. The anode of the sampling valve $V_4$ is then connected to the grid of the amplifying valve $V_5$, which may in this case be a pentode. Contrast control may be achieved by varying the potential applied to the cathode of $V_5$ by means of the potentiometer *5a*. The output from $V_5$ feeds the rectifier $V_6$ from which the control voltage is applied to the I. F. amplifier $V_1$, as in the embodiment described with reference to Figure 1.

The valve $V_9$ acts as a buffer to prevent breakthrough of the gating pulses to the video channel.

Except for the modifications described above, the circuit of Fig. 2 operates in a similar manner to that described with reference to Fig. 1, equivalent components bearing the same reference numerals in the two figures.

Fig. 4 shows a modification of the circuit shown in Figure 2 in which the sampling valve $V_4$ is fed from the cathode of $V_3$. In this case the interference pulses will be negative in polarity and consequently the diode or rectifier $V_8$ is reversed, and the resistance-capacity network RC is connected between its cathode and earth. Valve $V_9$ is again provided to act as a buffer to prevent gate pulse breakthrough, and the sampling diode $V_4$ is arranged as in Fig. 1, and the circuit operates in the same manner as described with reference to that figure.

In a modification of Fig. 4, the diode $V_8$ may be dispensed with since the negative-going interference pulses are capable of cutting-off the valve $V_9$ if the bandwidth at its cathode is suitably restricted. This may be effected, as shown in Figure 5, by connecting the resistance-capacity integrating network RC in the cathode of $V_9$. It is desirable to take the input to the grid of $V_9$ from a tapping down the cathode load of $V_3$ since the time constant network in the cathode of $V_9$ may cause the grid to take current during any fast positive-going picture components as occurs on sudden white-to-black transfers.

The circuit of Fig. 5 otherwise operates for effecting automatic picture control in the same manner as described with reference to Figs. 1 and 4.

The automatic picture control circuit of Fig. 5 can be advantageously used in conjunction with a circuit for suppressing impulsive (white spot) interference on the cathode ray tube. For this purpose use is made of the almost interference-free signal at the cathode of $V_9$ as a bias on a limiting valve to which the received video signal is also applied, the bias voltage being so adjusted that only the interference pulses will cause the limiting valve to conduct and produce a suppression signal which is fed to the cathode ray tube to suppress the beam during the interefrence. This is achieved, as shown in Fig. 5, by feeding the signal of reduced bandwidth which occurs at the cathode of $V_9$ through the potentiometer 11 to the grid of valve $V_{10}$, to the cathode of which is fed the received video waveform from the anode of the video amplifier $V_2$. The adjustable tapping on the potentiometer 11 is adjusted so that the potential of the biassed waveform applied to the grid of the valve $V_{10}$ will keep $V_{10}$ cut-off during the potential fluctuations caused by the picture components of the video signal applied to its cathode, but so that the valve $V_{10}$ will conduct upon the occurrence of interference pulses applied to said cathode. Upon the application thereto of interference pulses, the cathode of $V_{10}$ will go rapidly negative with respect to its grid, since the bias waveform on the grid cannot follow rapid transients, and therefore the valve $V_{10}$ will conduct to produce an output voltage across its anode load resistance, which voltage is applied as a suppression signal to the grid of the cathode ray tube 12 to suppress the beam during the interference pulses. The bias potential is adjusted by the potentiometer 11 to be very close to the video signal potential on the cathode of $V_{10}$ in order to achieve maximum suppression of interference pulses. The potentiometer 13 serves for brightness control.

This "white spot" suppressor arrangement operates to suppress interference pulses which have an amplitude less than peak white, thus reducing considerably the effect of interference on black or grey parts of the picture. The circuit is substantially independent of the amplitude of the input signal since variation in amplitude of the input signal produces a variation in amplitude of the bias waveform as well as of the video waveform applied to the cathode of the valve $V_{10}$.

Whilst particular embodiments have been described, it will be understood that various modifications may be made without departing from the scope of the invention. Thus, for example, instead of using a diode for measuring the value of the black level periods, other equivalent unidirectional conducting devices may be used.

We claim:

1. In a television receiver for receiving a television signal comprising a series of picture signals interspersed with synchronising signals followed by periods defining the black level of the picture signal, a demodulator for demodulating the received television signal, a signal sampling rectifier having two electrodes, a resistor connected between the two electrodes of said rectifier, a condenser connected in series with one electrode of said rectifier, a load connected between the other electrode of said signal sampling rectifier and a point of fixed potential, an amplifier connected to the output of said demodulator for amplifying the demodulated television signal, means for feeding the amplified demodulated televison signal from the output of said amplifier across said load with such polarity that any noise pulses present on said demodulated television signal reduce the potential difference across said rectifier, means for producing sampling pulses, means for timing said sampling pulses to occur respectively during the black level periods in the television signal, means for feeding the sampling pulses, at an amplitude greater than the amplitude of said picture signal across said load, through said condenser to the one electrode of said rectifier, to render said rectifier conducting and restore the tips of said sampling pulses to the potential across said load, said resistor and condenser having a time constant sufficiently long to maintain the rectifier non-conducting between sampling pulses, means for smoothing said restored pulses to provide a control voltage and means for feeding said control voltage to at least one stage of said receiver.

2. In a television receiver for receiving a television signal comprising a series of picture signals interspersed with synchronising signals followed by periods defining the black level of the picture signal, a demodulator for demodulating the received television signal, a signal sampling rectifier having two electrodes, a resistor connected between the two electrodes of said rectifier, a condenser connected in series with one electrode of said rectifier, a load resistor connected between the other electrode of said signal sampling rectifier and a point of fixed potential, an amplifier connected to the output of said demodulator for amplifying the demodulated television signal, means for feeding the amplified demodulated television signal from the output of said amplifier across said load resistor with such polarity that any noise pulses present on said demodulated television signal reduces the potential difference across said rectifier, a line time-base output transformer, means for deriving sampling pulses from said line output transformer, a delay network for timing said sampling pulses to occur respectively during the black level periods in the television signal, means for feeding the sampling pulses, at an amplitude greater than the amplitude of said picture signal across said load resistor, through the condenser to the one electrode of said rectifier to render said rectifier conducting and restore the potential at the other electrode of said rectifier to the potential existing across said load resistor during the sampling pulses, said resistor and condenser having a time-constant sufficiently long to maintain the rectifier non-conducting between sampling pulses, means for smoothing said restored potential to provide a control voltage, and means for feeding said control voltage to at least one state of said receiver.

3. In a television receiver for receiving a television signal comprising a series of picture signals interspersed with synchronising signals followed by periods defining the black level of the picture signal, a demodulator for demodulating the received television signal a signal sampling diode having an anode and a cathode, a resistor connected between said anode and cathode, a condenser connected in series with the cathode of said diode, a load resistor connected between the anode of said diode and a point of fixed potential, an amplifier connected to the output of said demoduulator for amplifying the demodulated television signal, means for feeding the amplified demodulated television signal from the output of said amplifier across said load resistor with such polarity that the synchronising pulses are positive with respect to the video signal, means for producing negative-going sampling pulses, means for timing said sampling pulses to occur respectively during the black level signal periods in the television signal, means for feeding the sampling pulses through said condenser to the cathode of said diode to render said diode conducting and restore the potential at the cathode of said diode to the black level potential existing across said load resistor during the sampling pulses, means for smoothing the potential at the cathode of said diode to provide a control voltage and means for feeding said control voltage to at least one stage on said receiver.

4. In a television receiver for receiving a television signal comprising a series of picture signals interspersed with synchronising signals followed by periods defining the black level of the picture signal, a demodulator for demodulating the received television signal, a signal sampling diode having an anode and a cathode, a resistor connected between said anode and cathode, a condenser connected in series with the anode of said diode, a load resistor connected between the cathode of said diode and a point of fixed potential, an amplifier connected to the output of said demodulator for amplifying the demodulated television signal, means for feeding the amplified demodulated television signal from the output of said amplifier across said load resistor with such polarity that the synchronizing pulses are negative with respect to the video signal, means for producing positive-going sampling pulses, means for timing said sampling pulses to occur respectively during the black level signal periods in the television signal, means for feeding the sampling pulses through said condenser, to the anode of said diode to render said diode conducting and restore the potential at the anode of said diode to the black level potential existing across said load resistor during the sampling pulses, means for smoothing the potential at the anode of said diode to provide a control voltage and means for feeding said control voltage to at least one stage on said receiver.

5. In a television receiver for receiving a television waveform comprising picture signals interspersed with synchronising signals followed by periods defining the black level of the picture signal, a demodulator for demodulating the received television signal, a signal sampling rectifier having two electrodes, a resistor connected between the two electrodes of said rectifier, a condenser connected in series with one electrode of said rectifier, a load connected between the other electrode of the signal sampling rectifier and a point of fixed potential, a buffer stage fed from the output of said demodulator, means for feeding the demodulated television signal through said buffer stage to said load connected to said signal sampling rectifier with such polarity that any noise pulses present on said demodulated television signal reduce the potential difference across said rectifier, means for producing sampling pulses, means for timing said sampling pulses to occur during the black level periods of the television waveform, means for feeding said sampling pulses through said condenser to the one electrode of said signal sampling rectifier to render said rectifier conducting during the sampling pulse periods and restore the tips of said sampling pulses to the potential across said load, said resistor and condenser having a time constant sufficiently long to maintain the rectifier non-conducting between sampling pulses, means for amplifying the restored pulses, a pulse rectifying device connected to the output of said amplifying means, a smoothing circuit connected to the output of said pulse rectifying device and means for feeding the control voltage produced across said smoothing circuit to at least one stage of said receiver.

6. In a television receiver for receiving a television waveform comprising picture signals interspersed with synchronising signals followed by periods defining the black level of the picture signals, a demodulator for demodulating the received television signal, a signal sampling rectifier having two electrodes, a resistor connected between the two electrodes of said rectifier, a condenser connected in series with one electrode of said rectifier, a load connected between the other electrode of the signal sampling rectifier and a point of fixed potential, an integrating circuit having a limited band-width fed from the output of said demodulator, a buffer stage connected to said integrating circuit, means for feeding the demodulated television signal through said integrating circuit and said buffer stage to said load connected to said signal sampling rectifier, a line timebase output transformer, means for producing sampling pulses from said line timebase output transformer, means for timing said sampling pulses to occur during the black level periods of the television waveform, means for feeding said sampling pulses through said condenser to the one electrode of said signal sampling rectifier to render said rectifier conducting durnig the sampling pulse periods and restore the potential at said one electrode to the potential across said load during the sampling pulses, said resistor and condenser having a time constant sufficiently long to maintain the rectifier non-conducting between sampling pulses, means for amplifying the restored potential, a pulse rectifying device connected to the output of said amplifying means, a smoothing circuit connected to the output of said pulse rectifying device, and means for feeding the control voltage produced across said smoothing circuit to at least one stage of said receiver.

References Cited in the file of this patent

UNITED STATES PATENTS

| | | |
|---|---|---|
| 2,249,533 | Lewis | July 15, 1941 |
| 2,307,387 | Blumlein | Jan. 5, 1943 |
| 2,586,193 | Wendt | Feb. 19, 1952 |

FOREIGN PATENTS

| | | |
|---|---|---|
| 512,109 | Great Britain | Aug. 29, 1939 |

OTHER REFERENCES

Abstract: Wendt, No. 731,139, May 8, 1951.